PARALLEL TO SERIAL CONVERTER UTILIZING DELAY MEANS
Filed Nov. 25, 1960
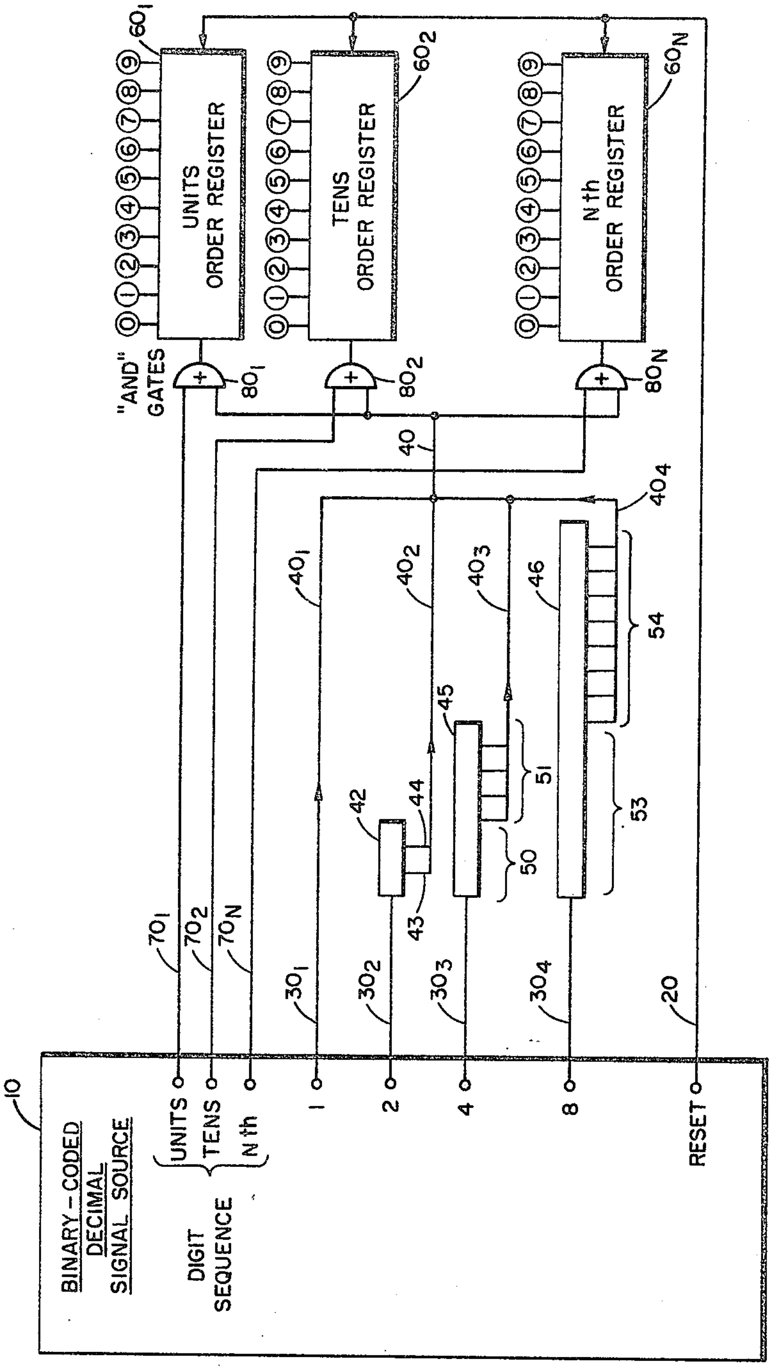
INVENTOR.
CARL G. SHOOK
BY W. J. Shanley Jr.
ATTORNEY 3,264,635

PARALLEL TO SERIAL CONVERTER UTILIZING DELAY MEANS

Carl G. Shook, Rochester, N.Y., assignor to General Dynamics Corporation, Rochester, N.Y., a corporation of Delaware Filed Nov. 25, 1960, Ser. No. 71,779
4 Claims. (Cl. 340—347)

This invention generally relates to the conversion of parallel binary information into serial decimal information and, more particularly, to the conversion of such information into a serial pulse train in which the number of pulses is representative of the number being converted.

Such conversions are necessary in data processing and data handling systems since the data processing or handling operation is usually carried on in the binary system of notation. However, when the information is read out in order to be utilized by the operator of the machine, it is usually necessary to convert the information to the decimal system of notation prior to the display and/or printing of the read-out information. As is well known in the data processing field, the input-output equipment is the limiting factor which governs the speed of operation of this system. Thus, it is highly desirable to speed up and simplify, for more reliable operation, the output equipment of data processing systems.

Accordingly, it is an object of the present invention to provide an improved device for converting parallel binary information into serial decimal information.

It is another object of this invention to provide an improved output system for converting parallel binary information and displaying it in the decimal system of notation.

A more detailed discussion of the features of the invention and the operational principles thereof follow with reference to the accompanying drawing which schematically shows a system for converting parallel binary coded information to serial decimal information and thereafter displaying it in the decimal system of notation.

In the drawing the parallel binary information to be converted is represented by pulses generated by signal source 10 and presented an output terminals 1, 2, 4, and 8. Terminals 1, 2, 4, and 8 of signal source 10 constitute a source of parallel binary coded decimal information in which each order of the decimal digit is sequentially represented by combinations of pulses present on its output terminals. Terminals 1, 2, 4, and 8 are respectively connected to converter input circuits $30_1$–$30_4$. In the binary coded decimal system of notation, the first group of pulses present upon input circuits $30_1$–$30_4$ will represent the units order digit while the second group will represent the tens order digit and so forth on up to the $N^{th}$ order digit.

Input circuit $30_1$ is directly connected to common output conductor 40 via conductor $40_1$ to thereby provide one pulse on conductor 40 in response to the reception of an input pulse on input circuit $30_1$. Tapped delay line 42, which is associated with input circuit $30_2$, provides means for producing two pulses in response to the application of a pulse upon input circuit $30_2$. Taps 43 and 44, which are connected to output conductor 40 via conductor $40_2$, are so positioned with respect to the input of the delay line so as to provide a pulse at output tap 43, *t* seconds after the generation of the sonic impulse at the input of delay line 42. Tap 44, in turn, is spaced from tap 43 a distance such that the sonic impulse in the delay line will take *t* seconds to travel from tap 43 to tap 44. Thus, delay line 42 provides two pulses upon conductor $40_2$ which are spaced in time from each other the same as the spacing in time between a pulse on conductor $40_1$ and the pulse generated on conductor $40_2$ by tap 43.

In like manner, delay line 45 provides means for producing four equally spaced output pulses on output circuit $40_3$ in response to an application of an input pulse on input circuit $30_3$. Section 50 of delay line 45 provides means for timing the pulses upon conductor $40_3$ so that they will arrive upon output conductor 40 in spaced time relationship so as not to interfere with the pulses arriving upon conductors $40_1$ and $40_2$.

Delay line 46, which includes sections 53 and 54, cooperate in like manner to produce eight properly timed output pulses in response to the application of a pulse upon input circuit $30_4$.

The composite pulse trains appearing upon conductor 40 are sequentially applied to the input of registers $60_1$–$60_N$ in accordance with the decimal order then being converted. This is accomplished by sequentially enabling AND gates $80_1$–$80_N$ to thus allow the serial pulse trains representative of each decimal order to enter the corresponding one of the registers. These enabling potentials, which sequentially appear upon input circuits $70_1$–$70_N$, last a sufficient length of time to accommodate the last pulse that would be generated in a pulse train representative of the highest number to be converted. Thus, in the illustrated embodiment, the potentials upon conductors $70_1$–$70_N$ have to last a sufficient length of time so as to allow the last pulse which would be present on conductor $40_4$, in response to the application of a pulse upon input circuit $30_4$, to enter the corresponding order register before the next succeeding AND gate is enabled.

Reset input circuit 20 is connected in parallel to the reset input of register $60_1$–$60_N$ to thereby provide for the resetting of the registers upon the registering of the highest order of the number to be converted.

This invention has been specifically described with reference to the conversion of a binary coded decimal signal into the decimal system of notation. However, the invention may also be applied to the conversion of information in another radix into the decimal system of notation without departing from the spirit or scope of the invention as defined in the appended claims.

What is claimed is:

1. A code converter for converting a code from an input means manifested as the value of any given number in parallel straight binary form into a series of one or more time-spaced pulses equal in number to said given number, said converter comprising a plurality of input terminals each corresponding to a different order of said binary code, means for simultaneously applying input pulses from said input means to certain ones of said input terminals in accordance with the value of said given number, a single output terminal, and a plurality of individual means coupled respectively between each input terminal and said output terminal and responsive to the presence of an input pulse on the input terminal to which that individual means is coupled for applying to said output terminal that predetermined number of time-spaced pulses which corresponds to the order of the binary code of the input terminal to which that individual means is coupled, the time-spaced pulses applied by any one of said individual means occurring in non-overlapping relationship with the time-spaced pulses applied by any other individual means.

2. The code converter defined in claim 1, wherein each individual means coupled to an input terminal corresponding to an order of said binary code higher than the lowest order thereof comprises a tapped delay line having a number of taps equal to said predetermined number, the location of any one tap of any delay line relative to the location of any other tap of that or any other delay line being such that the difference in delay between an input terminal and said one tap and the delay between an input terminal and said other tap exceeds the width of an input pulse, and means for coupling all the taps of all the delay lines in parallel to said output terminal.

3. The code converter defined in claim 2, wherein said individual means coupled to that particular input terminal corresponding to the lowest order of said binary code comprises a conductor directly connecting said particular input terminal to said output terminal.

4. The code converter defined in claim 1 further comprising output means coupled to said output terminal.

References Cited by the Examiner

UNITED STATES PATENTS

| | | | |
|---|---|---|---|
| 2,641,698 | 6/1953 | Gloess et al. | |
| 2,655,607 | 10/1953 | Reeves | 307—88.5 |
| 2,787,418 | 4/1957 | MacKnight | 340—347 |
| 2,810,518 | 10/1957 | Dillon et al. | 340—347 X |
| 2,873,386 | 2/1959 | Schlei | 307—88.5 |

DARYL W. COOK, *Acting Primary Examiner.*

IRVING L. SRAGOW, MALCOLM A. MORRISON, *Examiners.*

T. W. FEARS, S. C. CORWIN, K. R. STEVENS, *Assistant Examiners.*